March 11, 1924.

E. F. DEACON

VALVE MECHANISM

Filed July 25, 1922

INVENTOR
Edward F. Deacon
BY
ATTORNEY

Patented Mar. 11, 1924.

1,486,567

UNITED STATES PATENT OFFICE.

EDWARD F. DEACON, OF ST. LOUIS, MISSOURI, ASSIGNOR TO GUS V. BRECHT BUTCHERS' SUPPLY COMPANY, OF ST. LOUIS, MISSOURI, A CORPORATION OF MISSOURI.

VALVE MECHANISM.

Application filed July 25, 1922. Serial No. 577,438.

*To all whom it may concern:*

Be it known that I, EDWARD F. DEACON, a citizen of the United States of America, residing at the city of St. Louis, State of Missouri, United States of America, have invented a certain new and useful Valve Mechanism, of which the following is such a full, clear, and exact description as will enable any one skilled in the art to which it appertains to make and use the same, reference being had to the accompanying drawings, forming part of this specification.

My invention relates to a valve mechanism which in the form shown is designed especially for use in gas compressing machines such as ammonia compressors but which is applicable to many situations where puppet valves are used.

The object of the invention is to form a simple unitary valve structure capable of being readily assembled and disassembled and without the use of movable nuts or other removable spring bearing members on the valve stem thus positively preventing the inlet valve from being drawn into a compressor cylinder as a result of accidental disengagement of parts.

Figure 1:
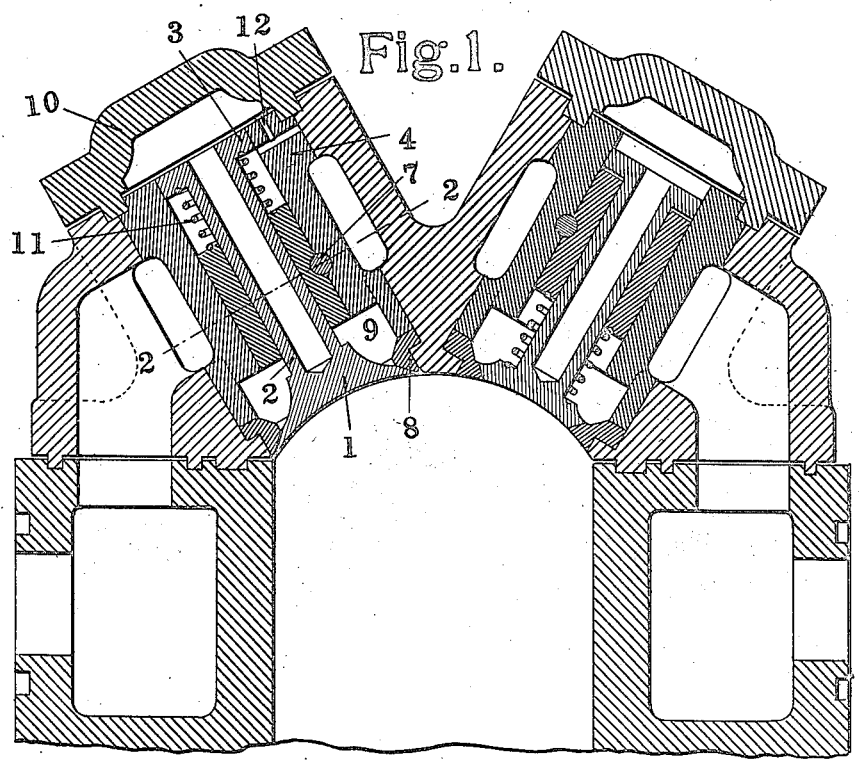
Figure 2:
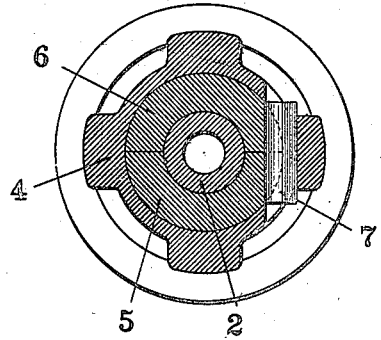

In the accompanying drawings which illustrate my invention, Figure 1 is a cross sectional view showing a portion of a compressor cylinder with the inlet and outlet valves in position in the head. Figure 2 is a cross sectional view along the line 2—2 of Figure 1.

The inlet valve assembly comprises a valve 1 having an integral stem 2 which stem is provided with an integral enlarged head 3. The valve cage 4 is of one piece and has a central bore of such size that the head 3 of the valve stem may pass therethrough and in this bore is seated the parts 5 and 6 of a two part sleeve which forms the bearing for the valve stem. Pin 7 passing through the cage wall and through depressions as shown in the surfaces of the sleeve parts holds these parts in position in the cage.

In the structure shown the member 8 forms a valve seat and this member 8 together with the lower end of the cage wall forms the inlet valve chamber 9. The valve cage and seat are held in position in the casing forming the cylinder head by means of the removable cap 10. Spring 11 surrounds the valve stem and bears on the enlarged head of the stem and on the parts of the sleeve and retracts the valve to its closed position. 12 is a vent formed in the cage 4 and which allows the free passage of air during the first part of the downward stroke of the valve. When, however, the end of this vent is covered by the head 3, the air below the head will be compressed and assist the spring 11 in cushioning the end of the stroke.

The outlet valve is formed in the same way as the inlet valve with the exception of course that the spring bears on the valve itself and on the opposite end of the sleeve.

It will be apparent from the foregoing description that removal of the cap 10 permits the removal of the valve assembly and valve seat and withdrawal of the pin 7 allows the sleeve parts and the valve to be withdrawn from the cage and the separation of the sleeve parts from the stem. The spring may, of course, be removed over the enlarged head 3 by spreading its end over the head and then turning it off.

The structure described is rigid and comprises few parts and in view of the spring bearing on the end of the stem of the inlet valve being integral with the stem there is no possibility of the valve being released and drawn into the cylinder as sometimes happens when the spring bearing member has threaded or pinned engagement with the valve stem.

Having fully described my invention what I claim as new and desire to secure by Letters Patent of the United States is:

1. A valve device comprising a valve having its stem provided with an integral abutment, a one piece valve cage, a multipart sleeve therein forming a bearing for the valve stem, and a pin passing through the cage wall and through recesses in the sleeve parts to hold said parts in position.

2. A valve assembly comprising a one piece valve cage having a central bore of uniform diameter throughout, a valve having a stem integral with the valve and provided with an integral enlargement adapted to pass through said bore, a multipart sleeve fitting in said bore and forming a bearing for said stem, and means passing through the cage wall at a point intermediate the ends of the valve for holding the sleeve parts in position.

3. A valve assembly comprising a one piece valve cage having a central bore of uniform diameter throughout, a valve having a stem integral with the valve and provided with an integral enlargement adapted to pass through said bore, a multipart sleeve in said bore and forming a bearing for said stem, means passing through the cage wall and engaging with the sleeve parts to hold them in position, and a spring embracing the valve stem and bearing on the outer end of the sleeve and on the enlargement of the valve stem.

In testimony whereof, I have hereunto set my hand and affixed my seal.

EDWARD F. DEACON. [L. S.]